United States Patent [19]

Darby

[11] Patent Number: 4,873,574

[45] Date of Patent: Oct. 10, 1989

[54] NOISE MEASUREMENT FOR VIDEO SIGNALS

[75] Inventor: Ted A. Darby, Knoxville, Tenn.

[73] Assignee: North American Philips Corporation, New York, N.Y.

[21] Appl. No.: 288,061

[22] Filed: Dec. 20, 1988

[51] Int. Cl.$^4$ ............ H04N 17/00; H04N 17/02
[52] U.S. Cl. ............ 358/139; 324/57 N; 358/10; 358/36; 358/167
[58] Field of Search ............ 358/139, 10, 36, 167; 324/57 N

[56] References Cited

U.S. PATENT DOCUMENTS

| | | | |
|---|---|---|---|
| 4,172,263 | 10/1979 | Tenten | 358/139 |
| 4,535,353 | 8/1985 | Turner | 358/139 |
| 4,721,997 | 1/1988 | Wittrock | 358/139 |

Primary Examiner—Howard W. Britton
Attorney, Agent, or Firm—Algy Tamoshunas; Marianne R. Rich

[57] ABSTRACT

The present invention discloses a noise measurement method and system in a television signal receiver. In the preferred embodiment, the receiver has a noise reduction circuit and receives a composite television picture signal which contains noise, picture information, a trigger pulse (preferably the V-sync pulse), a horizontal synchronizing pulse (at least once per television scan line) and a standard signal adjacent in time to and later than the horizontal synchronizing pulse. The preferred standard signal is a back porch signal or a color burst signal. A comparator receives at least two samples of the standard signal and produces a comparison signal that is representative of the comparison of the two standard signal samples. Preferably the two standard signal samples are from two different scan lines. An accumulator circuit receives the comparison signal and generates a measured noise signal that is used to control the noise reduction circuit.

20 Claims, 2 Drawing Sheets

Noise Measurement System 10

Noise Measurement System 10

Composite Television Picture Signal
(not to time scale)

NOISE MEASUREMENT FOR VIDEO SIGNALS

FIELD OF THE INVENTION

This invention relates to a method and an apparatus for measuring the noise in video signals.

BACKGROUND OF THE INVENTION

Television picture signals contain random noise from a variety of sources. These sources include electronic noise generated within the transmitter, within the receiver and in the environment between the transmitter and the receiver. Many television signal receivers contain noise reduction circuits that may be adjusted to reduce the level of noise on the received signal without adversely affecting the processing of the received television signal. Often, this noise reduction circuit is manually adjusted to a level of noise reduction corresponding to an average level of expected noise. When the noise received at a television receiver is more than expected, or less than expected, the manually adjusted noise reduction system will not be optimally adjusted. An automatic noise measurement system may provide a means of controlling the noise reduction circuit in a television receiver so that low levels of noise reduction could be applied during the periods of low noise and high levels of noise reduction could be applied during periods of high noise.

Storey (U.S. Pat. Nos. 4,249,209 and 4,249,210, issued Feb. 3, 1981) provides for a video noise reduction system that utilizes successive scans of the television signal to produce a difference signal. This difference signal is then applied to the noise reduction circuit. The picture information is chosen for successive scans. When the difference between the successive lines is too large, it is assumed that there is motion in the picture. When the difference is small, it is assumed that the difference is due to the noise in the signal. The noise signal is then scaled and passed to a noise reduction circuit. The system as provided by Storey is not able to continuously measure the noise that exists in a signal where the picture is changing rapidly.

Balbes et al. (U.S. Pat. No. 4,189,755 issued Feb. 19, 1980) provide for measuring noise on the sync tip of a composite television picture signal by clamping the sync tip signal to ground and then applying the clamped sync tip signal to a precision rectifier. The output of the rectifier represents the noise level in the signal and the level of the television signal is determined from the magnitude difference between the sync tip and the back porch. A signal-to-noise ratio signal is generated and the bandwidth of the receiver is adjusted in response to the signal-to-noise ratio signal. If there is a color burst signal on the back porch, it is removed by a filter that may also remove part of the noise to be measured. Neither Storey nor Balbes et al. determine noise levels by comparing the back porch signal (or the color burst signal) from one scan line to the same signal from another scan line.

SUMMARY OF THE INVENTION

The present invention provides for a noise measurement system in a television signal receiver. The noise measurement system provides an automatic control signal for a noise reduction circuit in the receiver. The television receiver receives a composite television picture signal which is composed of picture information, a trigger pulse (indicating a television picture frame) (preferably the V-sync pulse), a horizontal synchronizing pulse (indicating a television scan line), a standard signal that is adjacent in time to and later than the horizontal synchronizing pulse and noise that is distributed throughout the picture signal. The noise measurement system comprises means for comparing at least two samples of the standard signal from two different times. A comparison signal is generated that is representative of the comparison of the standard signal samples. The comparison signal is then used to generate a measured noise signal that is representative of the noise throughout the composite television picture signal. This noise is measured by at least one comparison signal. The measured noise signal is transmitted to the noise reduction circuit upon receipt of the trigger pulse. In this manner, the noise reduction circuit receives a control signal that is representative of the noise throughout the composite television picture signal.

The trigger pulse may be a vertical synchronizing pulse, which occurs at least once per television picture frame, and the standard signal may be either a back porch signal or a color burst signal, which is adjacent in time to and later than a back porch signal. In a color NTSC signal, the color burst signal is shifted in phase by 180 degrees each line with the color burst in phase every other line. Therefore, the back porch and color burst signals should be the same every other line and any differences found between these signals at the receiving end must be noise acquired along the signal path from the transmitter.

The difference between two color burst signals separated by one color burst signal should be zero unless noise is present. The differences between alternate scan line color burst signals may be summed to give a total noise measure which may be used to automatically adjust the noise reduction circuit. The accumulation of color burst difference signals may be cleared out with the same trigger pulse as is used to trigger the transmission of the accumulated noise signals to the noise reduction circuit. This would mean that the noise reduction circuit may be adjusted with new noise information every picture frame. Alternatively, instead of accumulating the signals representative of noise in the picture signal, a recursive type filter may be used that would constantly update the noise reduction circuit instead of updating once every field.

It is an object of the present invention to provide a simple and effective means for measuring the noise level of a composite television picture signal. Another purpose is to provide a control signal for setting the level of noise reduction in a television system with noise reduction. It is a further object of the invention to substantially eliminate the need for manual controls to adjust the level of noise reduction in a video system.

BRIEF DESCRIPTION OF THE DRAWINGS

The present invention may be best understood by reference to the following detailed description of an exemplary embodiment when considered in conjunction with the drawings in which.

DETAILED DESCRIPTION OF THE DRAWINGS

Figure 1:
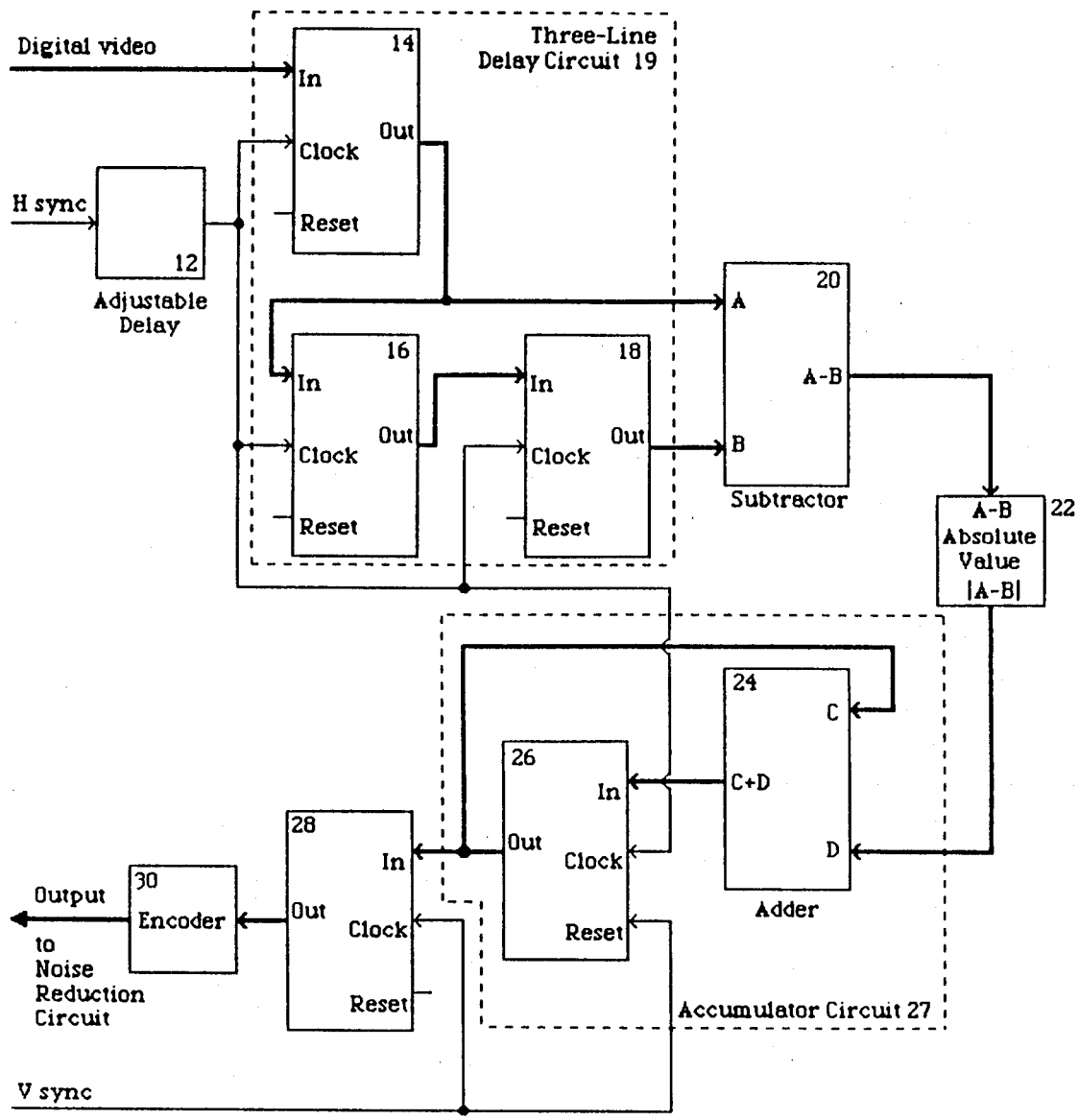
FIG. 1 is a block diagram of a preferred embodiment of the noise measurement system.
Figure 2:
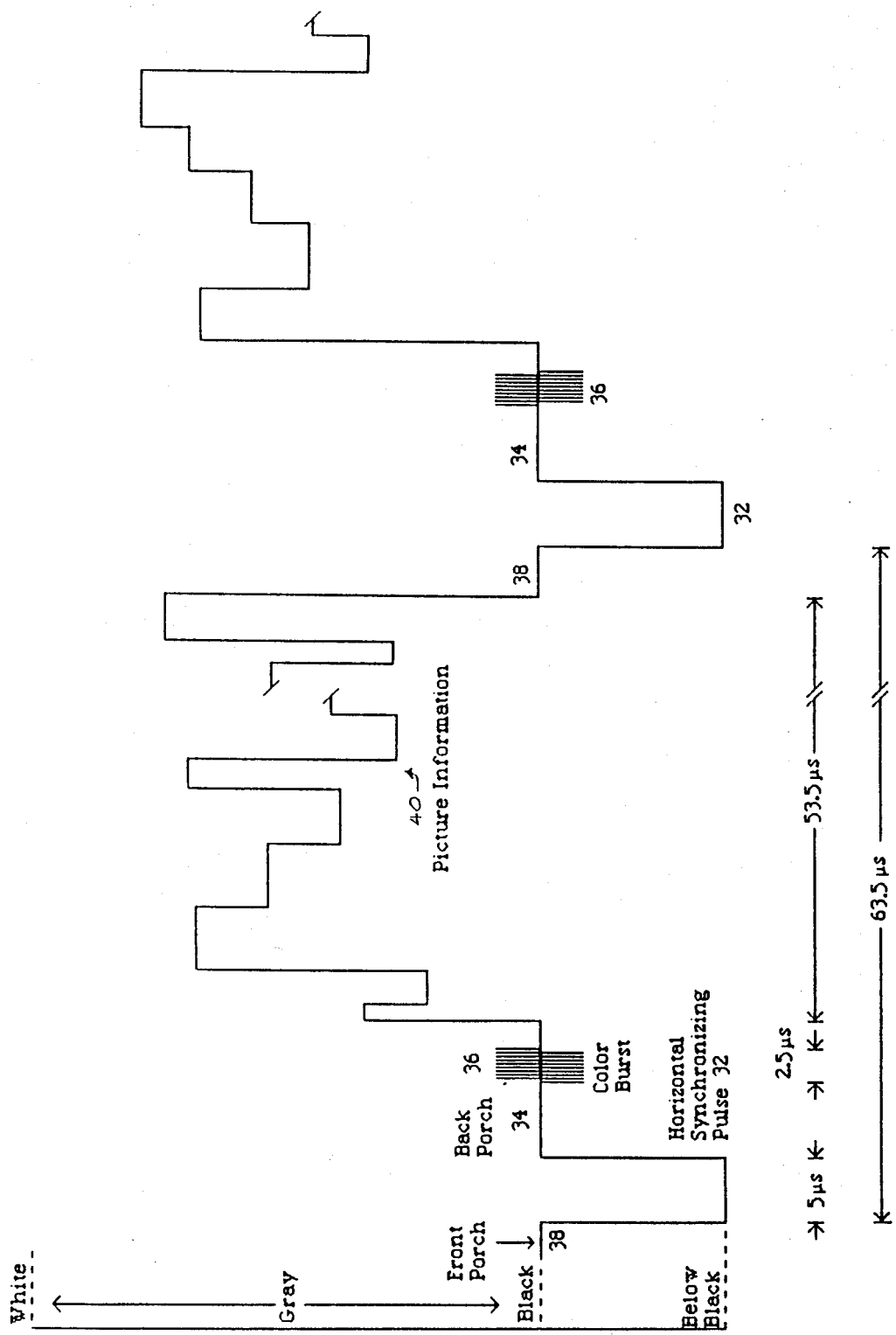
FIG. 2 is a timing diagram of a composite television picture signal (not to time scale).

Referring now to the drawings in which like reference characters designate like or corresponding parts throughout the several views, there is shown in FIG. 1 a noise measurement system 10 embodying the present invention in a television signal receiver that has a noise reduction circuit. A horizontal synchronizing pulse, which occurs once each video scan line, is applied to an adjustable delay circuit 12. The horizontal synchronizing pulse (H sync) is used as a time adjustable clock pulse during the measurement of the noise on a composite television picture signal. As is shown in FIG. 2, the H sync pulse 32 is followed in time by the back porch signal 34 and the color burst signal 36 (in a color composite television picture signal). The H sync pulse is preceded in time by a front porch signal 38. The picture information 40 is at various voltage levels representative of a luminance between black and white. The time adjustment of the width and the adjustable time delay of the H sync pulse 32 allow sampling of any particular part of the composite television picture signal when the adjusted and delayed signal is used as a clock pulse. The adjustable delay circuit 12 is adjusted to sample the back porch signal 34 or the color burst signal 36.

Referring again to FIG. 1, a digitized video signal is applied to an 8 bit delay flip-flop circuit 14. When the H sync pulse from the adjustable delay circuit 12 is applied to the clock input of the flip-flop circuit 14 there is an output of a portion of the digitized video from the flip-flop circuit 14. The portion of the digitized video signal that is output is determined by the time delay adjusted into the adjustable delay circuit 12. The H sync pulse is adjusted in time so that the back porch signal 34 or the color burst signal 36 is the output from the flip-flop circuit 14. The output of the flip-flop circuit 14 is then applied to an 8 bit delay flip-flop circuit 16 which also uses H sync as a clock pulse. The output of the flip-flop circuit 16 is applied to an 8 bit delay flip-flop circuit 18. Again, the H sync pulse from the adjustable delay circuit 12 is used as a clock pulse in the flip-flop circuit 18.

The combination of the delay the flip-flop circuits 14, 16 and 18 provides a three line delay circuit 19. For example, if a signal from a portion of video line 1 (i.e. the back porch 34 or the color burst signal 36) is at the output of the flip-flop circuit 18, then a signal from a portion of video line 2 is on the output of the flip-flop circuit 16 and a signal from a portion of video line 3 is on the output of the flip-flop circuit 14. The output of the flip-flop circuit 14 is also applied to one input of a subtractor circuit 20 and the output of the flip-flop circuit 18 is applied to the other input of the subtractor circuit 20. The output of the subtractor circuit 20 is the difference between the signal on alternate video lines. The signals on alternate video lines, therefore, are compared.

The signal on all of the video lines (the back porch 34 or color burst signal 36) would be identical from video line to video line if there was no noise on the signal. Therefore, the difference between two alternate lines should represent the noise on the composite television picture signal. Alternate lines are compared since the phasing of the color burst signal 36 is shifted 180 degrees each video line.

If there is no color burst signal 36, i.e. a black and white composite television picture signal, there is no need for the flip-flop circuit 18 and the output of the flip-flop circuit 16 may be applied directly to the second input of the subtractor circuit 20. On the other hand, there is no problem caused by the introduction of an additional delay flip-flop circuit when back porch signals are being compared.

The difference signal output from the subtractor circuit 20 is applied to the input of an absolute value circuit 22. The output of the absolute value circuit 22 is the absolute value of the difference between the two video lines compared. This output is applied to one input of a 16 bit adder circuit 24. The output of the adder circuit 24 is applied to a 16 bit delay flip-flop circuit 26 whose output is applied to the second input of the 16 bit adder circuit 24. The combination of the adder circuit 24 and the flip-flop circuit 26 comprises an accumulator circuit 27 for the accumulation of the absolute value signals from absolute value circuit 22 by the recursive addition of the output of the adder 24 to the output of the absolute value circuit 22. Alternate video line comparisons are added together, i.e. the comparison of lines 1 and 3 are added to the comparisons of lines 3 and 5, the sum of which is added to the comparisons of lines 5 and 7 and so forth. Again, the clock pulse for the flip-flop circuit 26 is the H sync pulse from the adjustable delay circuit 12. The output of the delay flip-flop circuit 26 is also applied to a delay flip-flop circuit 28. Preferably, the clock pulse for delay flip-flop circuit 28 is the vertical synchronization pulse (V sync), and the V sync is also used as a reset pulse for the flip-flop circuit 26. When V sync occurs, once per video frame, the delay flip-flop circuit 28 is triggered to output the accumulated noise signals to an encoder circuit 30. At the same time, V sync resets the flip-flop circuit 26. The encoder circuit 30 applies the accumulated noise signal to the noise reduction circuit in the television receiver. The accumulation of the noise signal for the next video frame then begins again.

In this manner a representation of the noise in a composite television picture signal is applied directly to the noise reduction circuit and it adjusts the television picture signal for the amount of noise present on the signal. It is not necessary to manually adjust the noise reduction circuit to an average expected noise level. The noise reduction circuit may be continuously adjusted to compensate for continuous variations in the noise in the received signal.

The foregoing is merely an illustration of a preferred embodiment of the present invention. It is not meant to restrict the invention to the specifics of that illustration. Numerous modifications, such as the use of specialized signals as a standard signal or the trigger signal, may be made without departing from the spirit of the present invention. For example, instead of using the V sync signal as the trigger signal for flip-flops 26 and 28, a totally independent trigger signal could be used so that the noise level is sampled after any number of scan lines. Preferably, such trigger signal would be synchronized with the V-sync or H-sync signals. Also, one may replace the accumulator circuit 27 with a recursive type filter so that the output (noise measurement signal) would be updated at a frequency equal to the sample rate. The scope of the invention as set forth in the claims is intended to include these variations and others.

In the specification above, the terminology "standard signal" is defined as a signal that occurs repeatedly in the television signal and, but for noise, would be the same at each occurrence. The back porch signal and the color burst signal are two examples of standard signals in a television signal.

What is claimed is:

1. A noise measurement system in a television signal receiver that receives a composite television picture signal having noise, picture information, vertical synchronization pulses indicating television picture frames, horizontal synchronizing pulses indicating television scan lines, and a standard signal that occurs repeatedly in the television signal and that would be the same at each occurrence but for noise, the system comprising:

means for producing at least two samples of the standard signal taken at different times;

means for comparing the at least two standard signal samples and for generating a comparison signal that is representative of the comparison of the at least two standard signal samples; and means for receiving the comparison signal and for generating a measured noise signal that is representative of the noise in the composite television picture signal as measured by at least one comparison signal.

2. The system of claim 1 wherein the television picture signal includes a back porch signal and the standard signal is the back porch signal.

3. The system of claim 1 wherein the television picture signal includes a color burst signal and the standard signal is the color burst signal.

4. The system of claim 1 wherein said means for producing at least two standard signal samples further comprises means for producing a first sample from a first scan line and for producing a second sample from a second scan line where said first and second scan lines are both even scan lines or odd scan lines.

5. The system of claim 1 wherein the means for comparing comprises:

means for finding a difference between the two samples of the standard signal and for generating a difference signal that is representative of the difference; and means for producing an absolute value signal corresponding to the absolute value of the difference signal.

6. The system of claim 1 wherein said receiver includes a noise reduction circuit and further comprising:

means for producing trigger pulses at selected time intervals; and means for receiving the trigger pulses and for transmitting the measured noise signal as a control signal to the noise reduction circuit when each trigger pulse is received, whereby the noise reduction circuit receives a control signal that is representative of the noise throughout the composite television picture signal.

7. The system of claim 6 wherein the trigger pulse is the vertical synchronizing pulse.

8. The system of claim 1 wherein the means for receiving the comparison signal further comprises:

means for accumulating successive comparison signals; and means for generating a measured noise signal that is representative of the accumulated successive comparison signals and of the noise throughout the composite television picture signal.

9. The system of claim 8 wherein the means for accumulating further comprises storage means having first and second inputs and an output for producing an output signal;

means for directing the comparison signal to the first input of said storage means and for directing the output signal of the storage means to the second input thereof; and means for adding the comparison signals to the output signal of the storage means to produce a sum and store the sum in said storage means, whereby the output signal constitutes accumulated successive comparison signals.

10. A noise measurement system in a television signal receiver that has a noise reduction circuit and that receives a composite television picture signal having noise, picture information, trigger pulses indicating television picture frames, horizontal synchronizing pulses indicating television scan lines, and a standard signal adjacent in time to and later than the horizontal synchronizing pulse, said standard signal occurring repeatedly in the television signal and being the same at each occurrence except for noise, the system comprising:

an adjustable delay circuit for receiving the horizontal synchronizing pulse and for generating a time adjustable clock pulse;

a first delay circuit for receiving the picture signal and for generating a first delayed output signal upon receipt of the clock pulse;

a second delay circuit for receiving the first delayed output signal and for generating a second delayed output signal upon receipt of the clock pulse;

a third delay circuit for receiving the second delayed output signal and for generating a third delayed output signal upon receipt of the clock pulse;

a subtractor circuit for finding the difference between the third delayed output signal and the first delayed output signal and for generating a difference signal that is representative of the difference between the third delayed output signal and the first delayed output signal;

an absolute value circuit for receiving the difference signal and for generating an absolute value signal that is representative of the absolute value of the difference between the first delayed output signal and the third delayed output signal;

an accumulation circuit for producing a summation signal corresponding to the additive sum of the absolute value signals from the absolute value circuit, outputting the summation signal upon receipt of the clock pulse and then zeroing the summation signal;

an output circuit for receiving the summation signal from the accumulation circuit and for generating a measured noise signal upon receipt of the trigger pulse; and an encoder circuit for receiving the measured noise signal and for generating a control signal for the noise reduction circuit, whereby the noise reduction circuit receives a control signal that is representative of the noise throughout the composite television picture signal.

11. The system of claim 10 wherein the television picture signal includes a back porch signal and a color burst signal and wherein the standard signal is selected from the group consisting of a back porch signal and the color burst signal.

12. The system of claim 10 wherein the trigger pulse is a vertical synchronizing pulse.

13. A method of noise measurement in a television signal receiver that has a noise reduction circuit and that receives a composite television picture signal having noise, picture information, trigger pulses indicating television picture frames, horizontal synchronizing pulses indicating television scan lines, and a standard signal adjacent in time to and later than the horizontal synchronizing pulse, the method comprising:
- producing and comparing at least two standard signal samples;
- generating a comparison signal that is representative of the comparison of the at least two standard signal samples; and
- receiving the comparison signal and generating a measured noise signal that is representative of the noise in the composite television picture signal as measured by at least one comparison signal.

14. The method of Claim 13 further comprising:
receiving the trigger pulse; and
transmitting the measured noise signal to the noise reduction circuit.

15. The method of noise measurement of claim 13 wherein the standard signal is a back porch signal.

16. The method of noise measurement of claim 13 wherein the standard signal is a color burst signal.

17. The method of noise measurement of claim 13 wherein said step of comparing comprises comparing a sample of the standard signal from a current scan line to a sample from two scan lines prior to the current scan line.

18. The method of noise measurement of claim 13 wherein the comparing further comprises:
- finding a difference between an alternate pair of standard signal samples;
- generating a difference signal that is representative of the difference between the alternate pair of standard signal samples; and
- finding an absolute value of the difference signal which is a comparison of the alternate pair of standard signal samples.

19. The method of noise measurement of claim 13 wherein receiving the comparison signal comprises:
- accumulating successive comparison signals; and
- generating a measured noise signal that is representative of the accumulated successive comparison signals and of the noise throughout the composite television picture signal.

20. The method of noise measurement of claim 19 wherein accumulating successive comparison signals comprises adding successive comparison signals to produce a summation signal.

* * * * *